(12) United States Patent
Asick

(10) Patent No.: US 6,499,224 B1
(45) Date of Patent: Dec. 31, 2002

(54) METHOD AND DEVICE FOR REPRODUCIBLY AND ACCURATELY POSITIONING A WORK PIECE ON A POWER TOOL

(76) Inventor: Albert Asick, 645 N. Locust St., Hazleton, PA (US) 18201

(*) Notice: Subject to any disclaimer, the term of this patent is extended or adjusted under 35 U.S.C. 154(b) by 0 days.

(21) Appl. No.: 09/924,236

(22) Filed: Aug. 7, 2001

(51) Int. Cl.[7] ............................................. B27C 5/04
(52) U.S. Cl. ........................ 33/628; 83/438; 83/522.11; 144/253.1
(58) Field of Search .......................... 33/628, 452, 464, 33/613, 626, 633, 636, 640, 641, 645; 83/438, 448, 522.11, 421, 522.15, 522.16, 522.17; 144/145.1, 253.1

(56) References Cited

U.S. PATENT DOCUMENTS

| | | | | |
|---|---|---|---|---|
| 2,680,458 A | * | 6/1954 | Grammer | 144/253.1 |
| 2,779,360 A | * | 1/1957 | Snow | 144/253.1 |
| 3,768,357 A | * | 10/1973 | McBride | 83/438 |
| 4,432,263 A | * | 2/1984 | Kowalchuk | 83/438 |
| 4,793,604 A | * | 12/1988 | Taylor | 269/303 |
| 5,215,296 A | * | 6/1993 | Adams et al. | 269/181 |
| 5,275,074 A | * | 1/1994 | Taylor et al. | 83/438 |
| 5,425,405 A | * | 6/1995 | Brodsky, Sr. | 144/253.1 |
| 5,487,319 A | * | 1/1996 | Cody | 33/640 |
| 5,603,164 A | * | 2/1997 | Haddix | 33/464 |
| 5,716,045 A | * | 2/1998 | Taylor | 269/303 |
| 5,890,524 A | * | 4/1999 | Tucker et al. | 144/253.1 |
| 6,095,024 A | * | 8/2000 | Brutscher et al. | 144/253.1 |

* cited by examiner

Primary Examiner—Christopher W. Fulton
(74) Attorney, Agent, or Firm—Mitchell A. Smolow

(57) ABSTRACT

The present invention provides a jig and a method for it use. The jig is interchangeable with a variety of power tools for reproducibly and accurately positioning a work piece on the power tool. A universal memory stick is slidably attached to a primary fence. A follower assembly is mounted to the primary fence for maintaining a predetermined relative position of the primary fence to the universal memory stick. The universal memory stick includes a universal stick template which enables the user to make, program, store and recall required stop positions used on the power tool to cut work pieces to required dimensions for a given project.

50 Claims, 16 Drawing Sheets

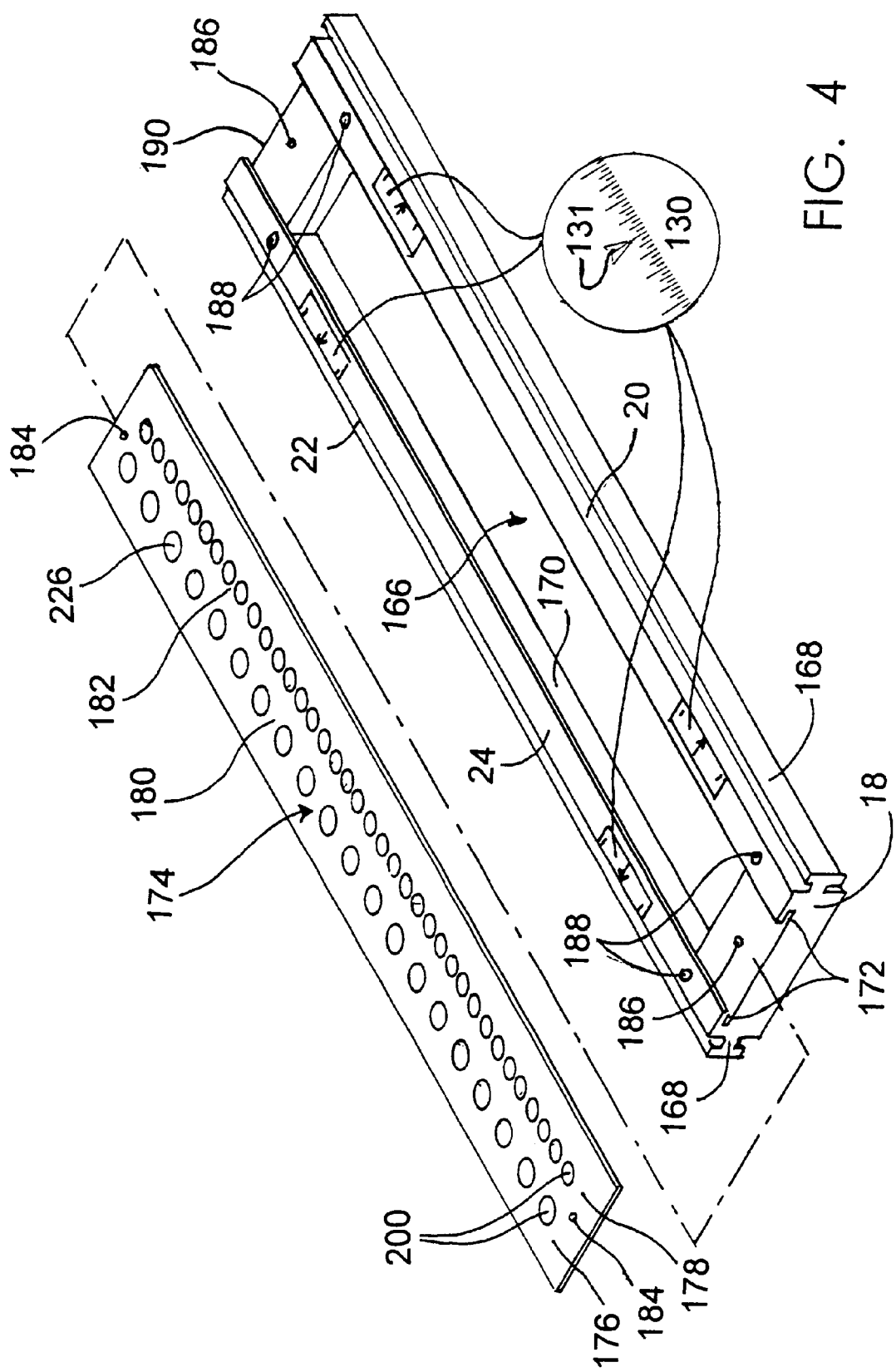

FIG. 11
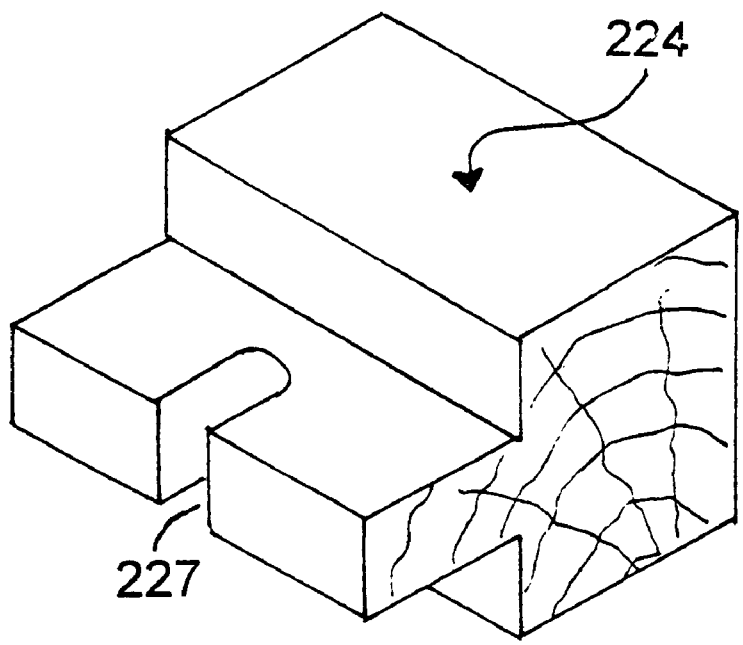
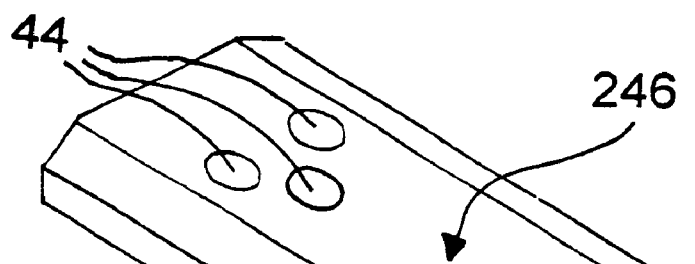
FIG. 12

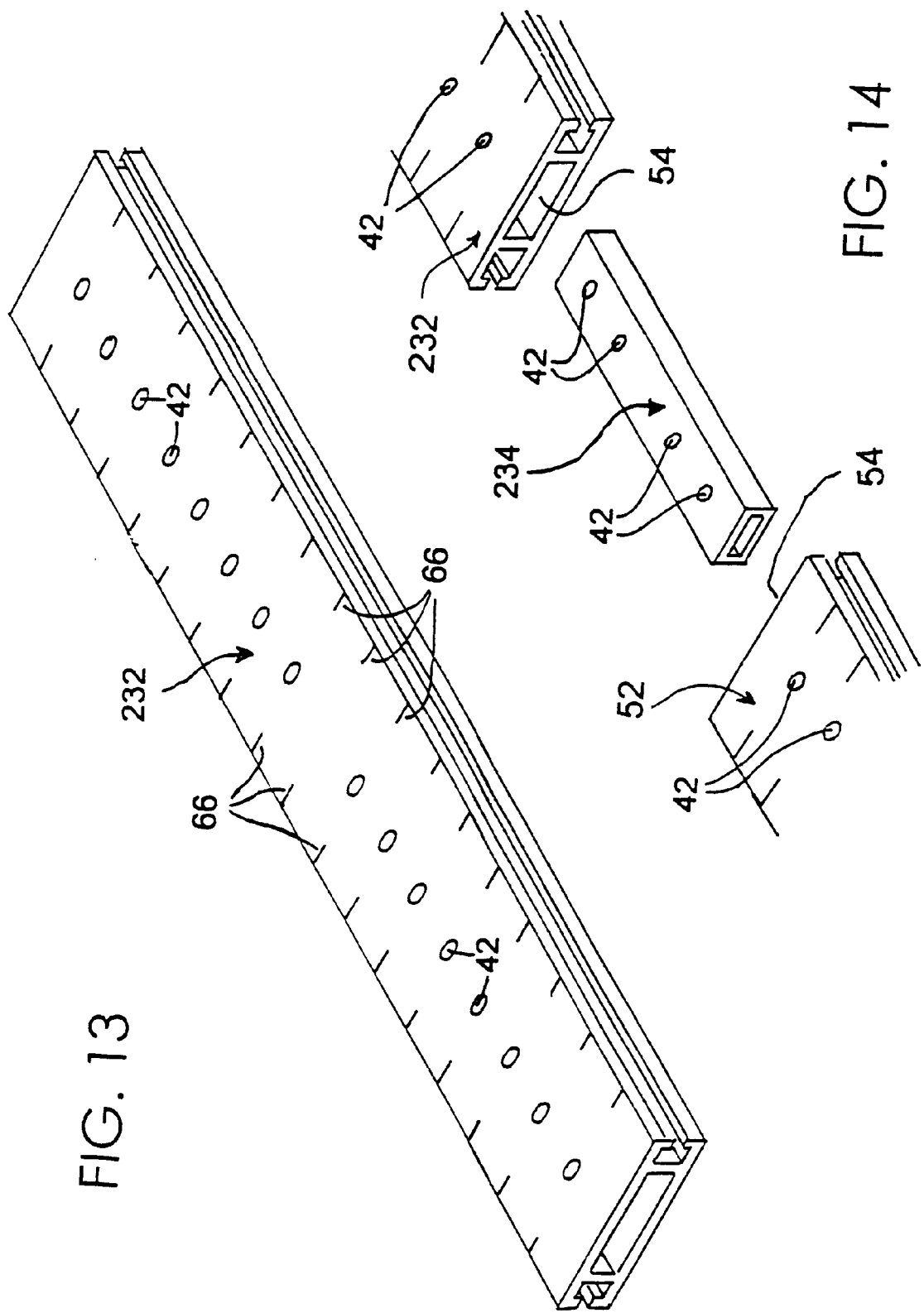

METHOD AND DEVICE FOR REPRODUCIBLY AND ACCURATELY POSITIONING A WORK PIECE ON A POWER TOOL

FIELD OF THE INVENTION

The present invention relates generally to power machine tools and more particularly to a power tool jig capable of storing various predetermined stop positions to reproducibly and accurately position a work piece on a power tool. The jig is programmable to store multiple stop positions required for an entire project and is transferable to a variety of different power machine tools.

BACKGROUND OF THE INVENTION

Precision woodworking, for example, cabinet making, often utilizes several different power tools for each project, requiring setting up each power tool and changing stop positions for a given work piece. For both the professional cabinet-maker and the home craftsman this can be a time consuming and expensive annoyance.

Woodworking operations require precise measurements for the cutting of wood stock to insure proper fit of assembled pieces. To insure proper fit, positioning jigs are used to position the work piece relative to a power tool cutting surface. Current practice utilizes positioning jigs for a wide variety of power tools such as a table saw, router table and drill press.

Although the advent of power machine tools has made woodworking both more efficient and easier, many of the techniques used today are virtually identical to techniques used centuries ago. However, positioning processes and devices used to determine the stop position for a cutting operation on the work piece are still evolving.

One such device used to position a work piece on a power machine tool is a fence, most commonly used on a table saw or router. Typically, the operator feeds the work piece by hand through the cutting tool by sliding one edge of the work piece along the fence, optionally, until the work piece contacts a stop block. The optional stop block located a predetermined distance from the cutting tool, placed to prevent further machining of the work piece.

Both the fence and optional stop block must be positioned to a new location each time a work piece cut is made to a different predetermined criteria. For this reason, multiple work pieces of identical shape are generally cut at the predetermined fence and optional stop block position prior to moving the fence and/or stop. Once the fence and/or optional stop has been moved, the fence and/or optional stop must be reset to a prior position to duplicate a previously cut piece. It is difficult and time consuming to accurately reposition the fence and optional stop in the original position, often resulting in inaccuracies in the final fit of the work pieces.

One shortcoming of the current practice of positioning devices is that they are typically made of heavy steel and permanently mounted to each woodworking power tool. Thus, they are quite cumbersome and time consuming to remove and reinstall. Additionally, it is quite expensive to equip each power tool with its own stop block and guide.

Accurate placement of each work piece cut is dependent upon the operator's experience and skill. This is particularly important when cutting multiple work pieces of identical dimensions. One current method of aiding the operator in achieving this accurate cut placement is to mechanically position the fence through the use of a lead screw and a rotating knob. The rotating knob turns the lead screw, which augurs and positions the fence. The fence is adjusted prior to each cutting operation to a predetermined distance from the cutting tool according to the desired location of the cut. Typically, the operator feeds the work piece by hand through the cutting tool by sliding one edge of the work piece along the fence.

A wide range of positioning jigs have been designed in an attempt to improve the accuracy and reproducibility of the positioning process. For example, U.S. Pat. Nos. 4,793,604 and 5,716,045 include a fixed lower body member and a moveable upper body member. After the fence has been positioned, racks are meshed together by tightening a knob threaded through the middle of the upper and lower body members to prohibit further movement.

U.S. Pat. No. 5,215,296 discloses a positioning jig using a blade and a movable carriage mounted thereon. The carriage rides on tubular rails mounted to a base. Movement to a desired position is facilitated by two sets of rollers mounted to the carriage and contacting the top and bottom of the tubular rails.

Current practice positioning jigs have a single unit fixed measurement spacing and are limited in maximum measurement length. They must be repositioned after each change in desired work piece shape, with resultant inherent inaccuracy. Additional problems inherent in current practice positioning jigs are the inability to attach varied additional apparatus to the jig, and the limited capacity to accommodate work pieces of longer lengths. Current practice jigs are designed for a specific dedicated power machine tool, with limited cross tool interchangeability.

Accordingly, there remains a need for an inexpensive simple jig that is interchangeable with different power machine tools, able to accurately perform multiple operations, and capable of easily and accurately reproducing prior measurement settings while not being limited to a single unit of measurement.

SUMMARY OF THE INVENTION

The present invention provides a jig for reproducibly and accurately positioning a work piece on a power tool that is interchangeable with a variety of woodworking power tools. The invention has a built in memory that enables the user to make, program and store many, if not all, of the required stop positions used on the power tool to cut work pieces to required dimensions for a woodworking project.

Once the jig is installed on the appropriate power tool, a memory stick is slid to the desired position for that operation and the work piece is held against a fence for drilling, sawing, or routing, as needed. The jig comprises a primary fence having a first end, an opposing second end, a first side, an opposing second side and a top and opposing bottom, wherein the first and second sides are interposed between the first and second ends and the top and opposing bottom are supported by the first end, second end, first side and second side.

A universal memory stick is slidably attached to the primary fence, the memory stick having a first end, an opposing face end, a first side, an opposing second side and a top, wherein the first and second sides are interposed between the first and face ends and the top is supported by the first end, face end, first side and second side and includes a universal memory stick template. A follower assembly is mounted to the primary fence for maintaining a relative position of the primary fence to the universal memory stick.

One advantage of the present invention is that the jig is interchangeable with a variety of power tools. Because differing power tools may require their own positioning jig, the cost savings are multiplied by the number of power tools required for a given project.

Another advantage of the present invention is the ability to permanently store predetermined stop positions for duplication and use at a later time. In this manner, work pieces may be repeatedly cut to reproducibly precise dimensions, even after the jig has been repositioned. Because the stop positions are customized by the operator, the number of predetermined stops may range from an unlimited number to the exact amount required by a particular project.

Yet another advantage is the operator's ability to alternate between varied units of incremental spacing. In this manner, the operator is not limited to a single measurement unit, as in current practice.

Still another advantage is the operator's unlimited ability to increase the linear range of stop positions. In this manner, work pieces of infinite length may be easily and accurately measured.

Another advantage of the present invention is the ability to easily fasten other attachments, such as additional jigs and templates, a changeable zero clearance cut off block or the work piece to the jig for use with differing power tools, without disturbing any jig adjustments.

Another advantage of the present invention is the ability to easily compensate for varying power tool cutter widths.

Continuing and often interrelated improvements in processes and materials, such as the improvements of the present invention, can provide cost reductions and major increases in the performance of devices such as table saws, router tables, drill presses and other power woodworking tools.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 4 is a perspective view of the universal memory stick.

FIG. 11 is a perspective view of the cut-off block.

FIG. 12 is a perspective view of the support bar.

FIG. 13 is a perspective view of the auxiliary fence.

FIG. 14 is a perspective view of the tenon, primary fence and auxiliary fence.

DETAILED DESCRIPTION OF THE INVENTION

Figure 1:
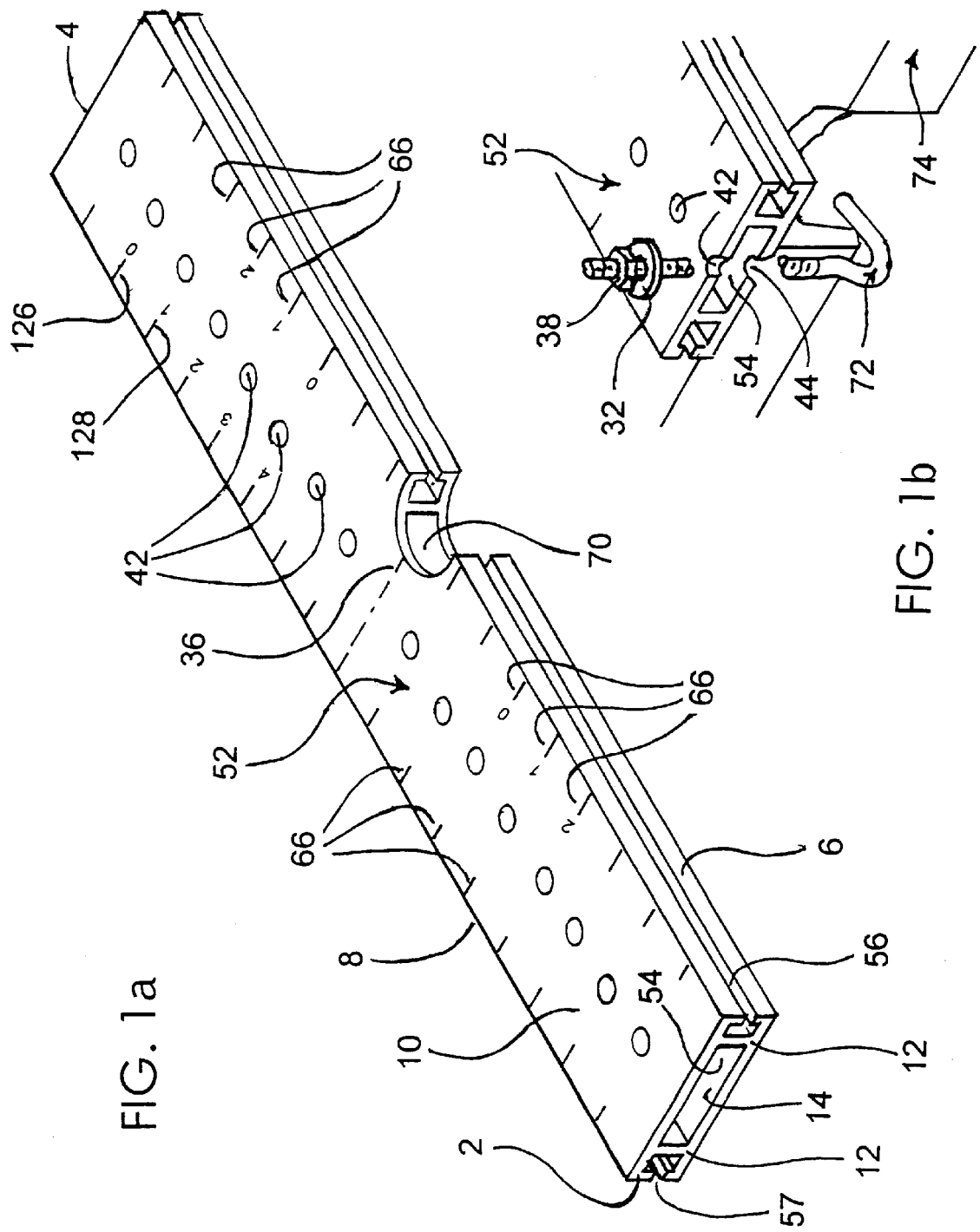
FIG. 1a is a perspective view of the primary fence.
FIG. 1b is a cross-section of the primary fence with J-hooks.

Referring now to the figures, in accordance with a preferred embodiment of the invention, there is shown in FIG. 1a a primary fence 52 having a first end 2, an opposing second end 4, a first side 6, an opposing second side 8 and a top 10 and opposing bottom (not shown). The first 6 and second 8 sides are interposed between the first 2 and second 4 ends. The top 10 and opposing bottom (not shown) are supported by the first end 2, second end 4, first side 6 and second side 8.

The primary fence 52 is preferably fabricated from a substantially rigid, preferably lightweight, material, for example, metal such as extruded aluminum, aluminum alloy and stainless steel, molded plastic, layed up plastic, wood and combinations thereof. In a preferred embodiment, the primary fence 52 is about 3' long, about 3" wide and about ¾" thick.

In order to further reduce weight while maintaining strength, the interior of the primary fence 52 is substantially hollow. In cross section, the interior of the primary fence 52 has three parts. The inner chamber forms a mortise 54 of preselected dimension. In a preferred embodiment, the mortise 54 is about 1¾" in width with walls 12 about ½" high extending from the inner surface (not shown) of the top 10 to the inner surface 14 of the bottom.

Two outer chambers about ½" wide flank the inner chamber. Each of these outer chambers has an opening with an upper and lower lip in the outside wall to form T-slots 56, 57 running along the length of each side 6, 8. T-slots 56, 57 are fabricated to slidably receive a mating T-bar of an attachment, for example, a universal memory stick or other power tool attachment (described below).

Machined along the centerline of the primary fence top 10 is a series of holes 42 spaced a unit measurement apart, for example, about 1" apart which coincide with counter-sunk hole 44 (FIG. 1b) machined into the primary fence bottom. As shown in FIG. 1b, the primary fence 52 can be fixed to various power tools by passing a fastener, for example, a J-bolt 72 through the counter-sunk hole 44 and top hole 42 such that the J-bolt 72 catches the lip of a power tool table 74. The J-bolt 72 is secured with washer 32 and nut 38. Optionally, the nut may be a wing nut for ease of removal.

Figure 2:
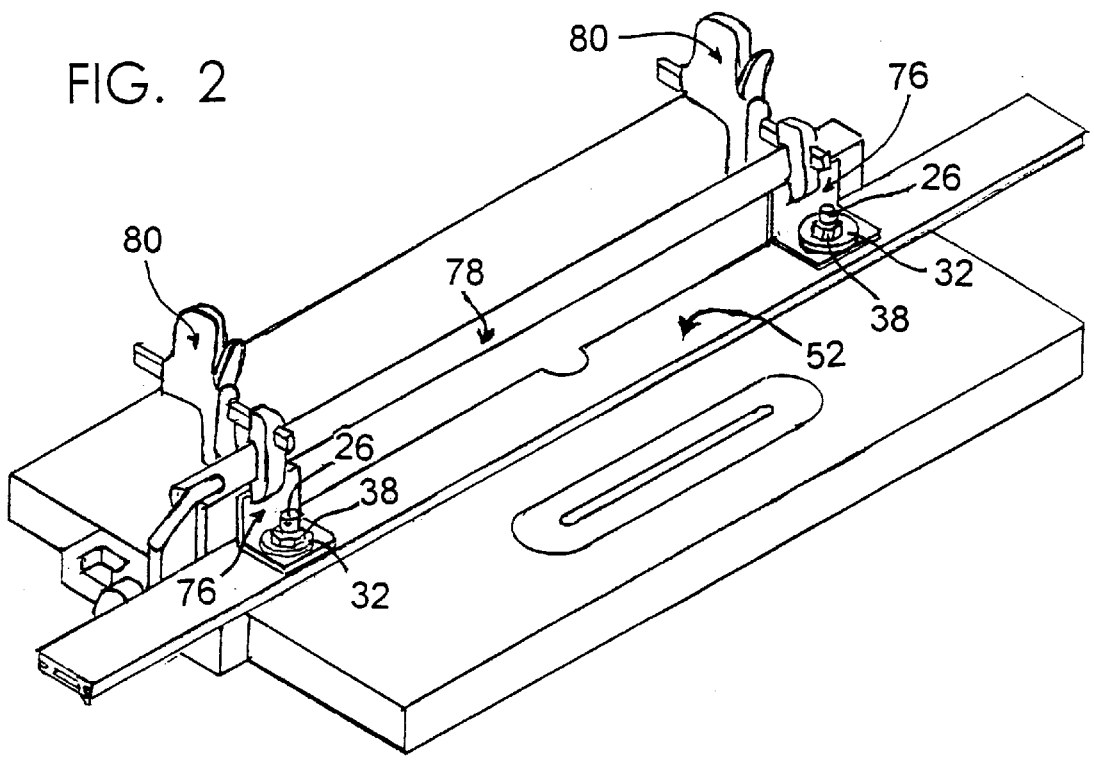
FIG. 2 is a perspective view illustrating the primary fence attached to a machine fence.
Figure 19A:
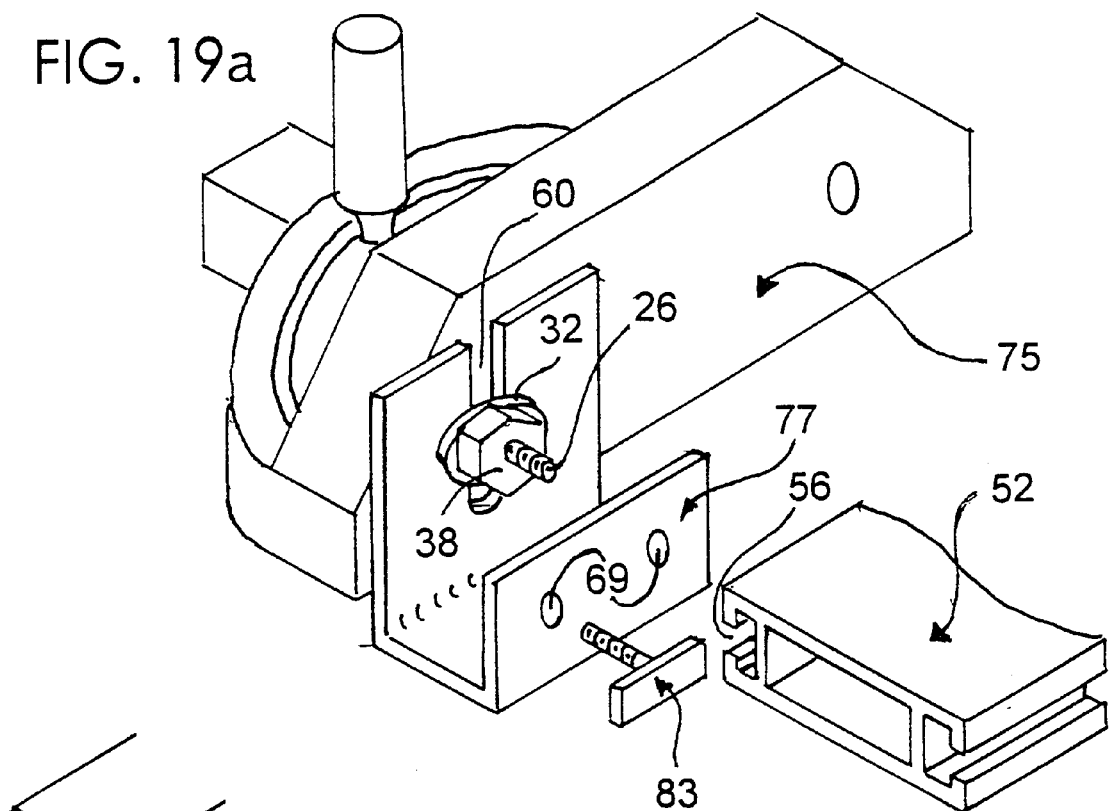
FIG. 19a is a perspective view of a U bracket attachment to a miter fence.
Figure 19B:
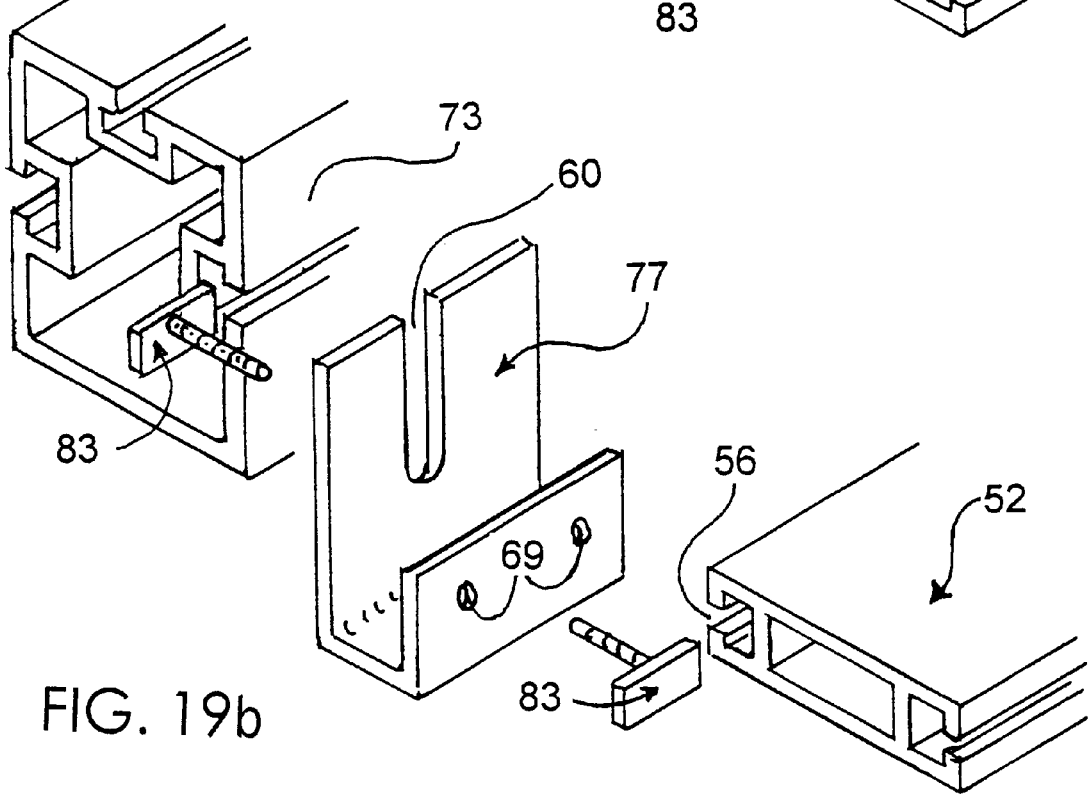
FIG. 19b is a perspective view of a U bracket attachment to a T slot power tool fence.

Alternatively, shown in FIG. 2, the primary fence 52 can be secured to a power tool table fence 78 with a fastener, for example, right angle bracket 76 and clamp 80, or as shown in FIG. 19a, a fastener such as U bracket 77 can be used to attach primary fence 52 to, for example, miter gauge fence 75 by passing bolt 26 through hole (not shown) in miter gauge fence 75, U slot 60, washer 32 and secured with nut 38. A bolt end of T-bolt 83 is passed through hole 69 of U bracket 77 and secured with washer and nut (not shown). The "T" end of T-bolt 83 is slidably received by T-slot 56 of primary fence 52. When the manufacturer's power tool fence 73 includes T-slots, shown in FIG. 19b, first T-Bolt 83 is substituted for bolt 26 to permit U bracket 77 to be slidably received by the power tool fence T-slot. Second T-bolt 83 is engaged as described above to connect U bracket 77 to primary fence 52.

Figure 18:
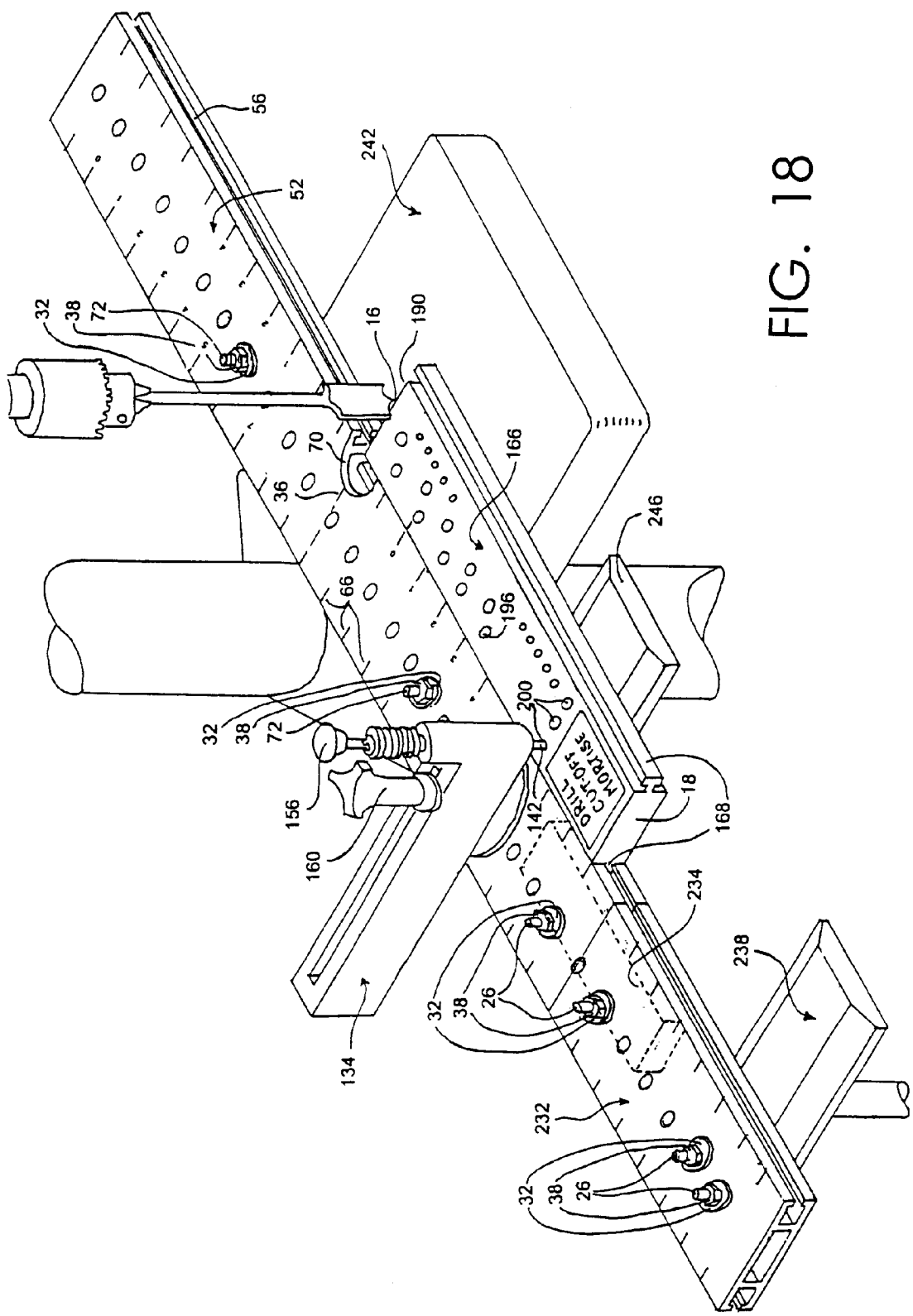
FIG. 18 is a perspective view of the jig arranged for drilling operation.

Returning to FIG. 1a, the outer edge of the primary fence top 10 is scribed with marks 66 of a predetermined unit of measurement, for example, marks one inch apart. Marks 66 are numbered beginning a predetermined distance, for example, two inches, from primary fence ends 2, 4, so pointer scale 130 of universal memory stick 166 (FIG. 4) or pointer scale 71 of an attachment, for example, a backboard 64 (FIG. 9), will indicate the correct distance to the cutting blade after final assembly (described below). Optionally, a cutout 70 is machined into the first side 6 of primary fence 52, for example, in the center, to accommodates a router (not shown) or drill bit 16 (FIG. 18).

Shown in FIG. 4 is universal memory stick 166 having a first end 18, an opposing face end 190, a first side 20, an opposing second side 22 and a top 24 and opposing bottom (not shown), wherein the first and second sides 20, 22 are interposed between the first end 18 and face end 190. The top 24 and bottom (not shown) are supported by the first end 18, face end 190, first side 20 and second side 22.

Figure 3A:
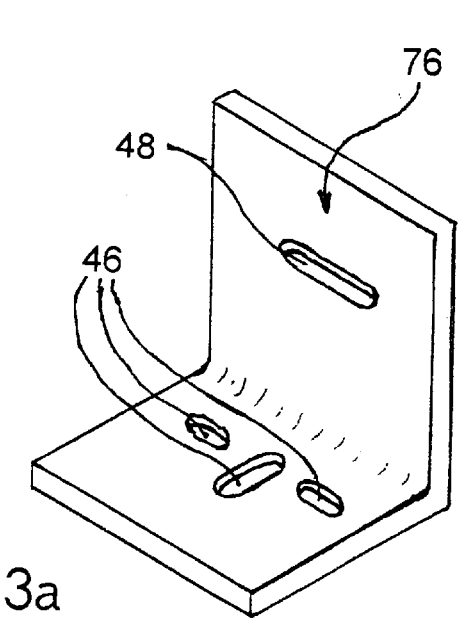
FIG. 3a is a perspective view of the right angle bracket.
Figure 17:
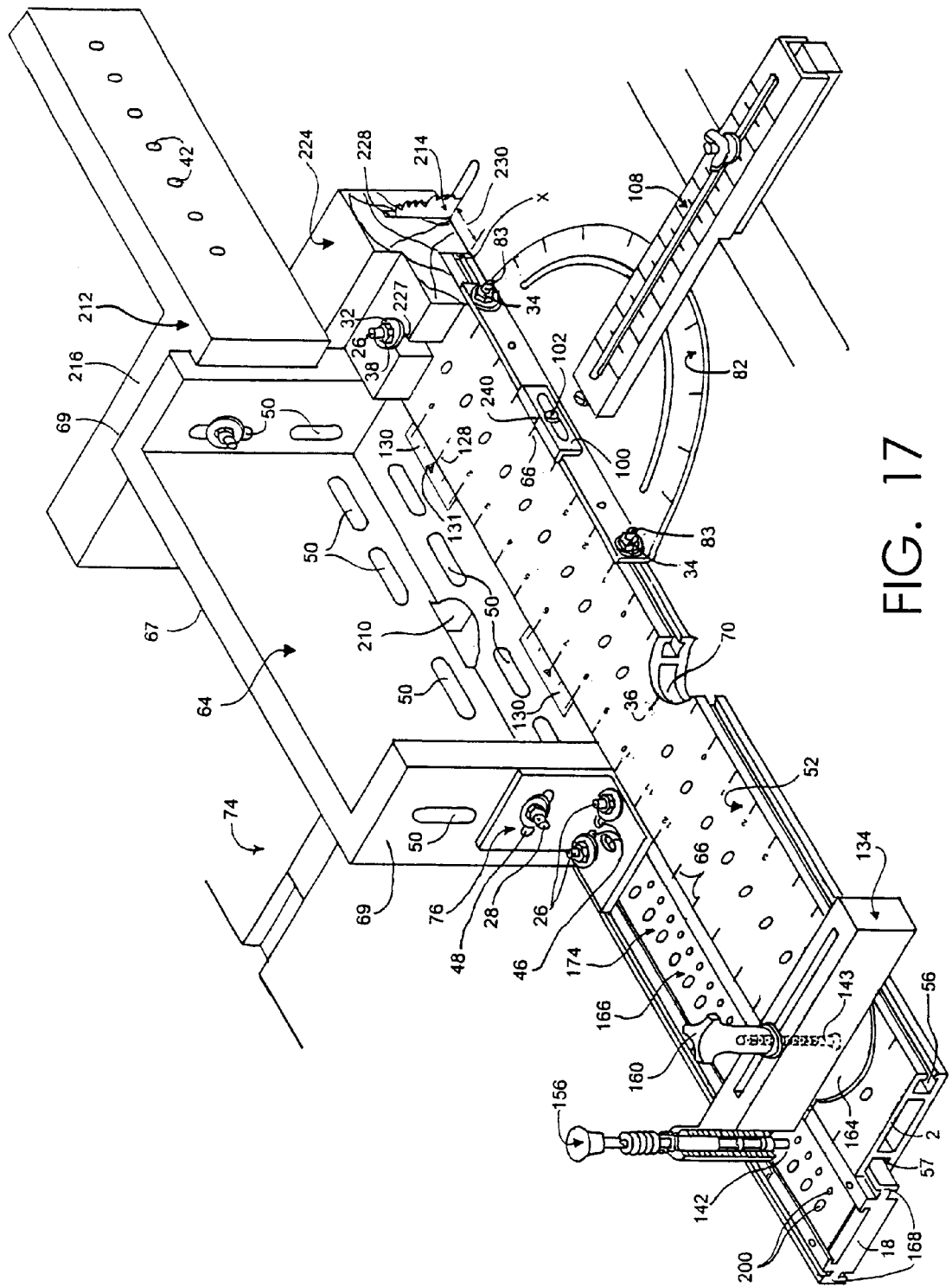
FIG. 17 is a perspective view of a jig/miter/backboard arrangement.

The universal memory stick 166 is preferably fabricated from a substantially rigid, preferably lightweight, material, for example, wood, metal such as extruded aluminum, aluminum alloy and stainless steel, molded plastic, layed up plastic and combinations thereof. In a preferred embodiment it is about 3" wide and 36" long. The sides 20, 22 are machined to form T-bar 168, which is slidably received into T-slot 57 of primary fence 52 (FIG. 1). Optionally, a bracket, for example, a substantially right angle bracket 76 (FIG. 3a), fastened to face end 190 provides a larger surface area for face end 190 and points for optional attachments (FIG. 17).

In a preferred embodiment, machined into the top 24 is a channel 170, for example, about 1" wide and about ⅝" deep extending about 2" from the first end 18 to about 2" from the face end 190. An undercut 172 of predetermined size, for example, approximately 3/32" undercut, is machined outward at the top of walls of the channel 170, and extends the full length of the universal memory stick 166 to slidably receive a universal stick template 174. In this manner, a space remains below the template 174 to receive a plunger point 148 of a follower assembly 134 (FIG. 6) (described below).

The universal stick template 174 is precision machined to contain at least one predetermined stop position 226, for example, a plurality of holes machined in a row at predetermined measurement units. The holes may be at repeating units of measurement, for example, English or metric units, or they may be positioned to reflect only those units of measurement required by a specific woodworking project, or they may combinations thereof. Universal stick template 174 may have a single track of stop positions 226 or, alternatively, multiple tracks of stop positions 226 may be fabricated to accommodate multiple repeating measurement units or project predetermined stop position 226 on a single universal stick template 174.

The machined holes are of a diameter sufficient to positively secure a follower assembly (described below). The hole diameter is not critical, so long as the center of the hole is precision located to the predetermined location. For example, if track 176 is machined to ⅜" center to center spacing 180, 25 machined holes would measure 9 inches center to center from the first hole to last hole, even if the hole size diameter differed. Likewise, track 178 machined to ¼" spacing 182 and 25 holes would measure 6 inches center to center from the first hole to last hole. In this manner an error in the machining of any one hole would not be compounded throughout the length of the universal stick template 174.

Once fabricated, universal stick template 174 can be stored and reused. In this manner, frequently manufactured items, such as cabinet doors and drawers can be made in a fraction of the time required under current practice.

Figure 5:
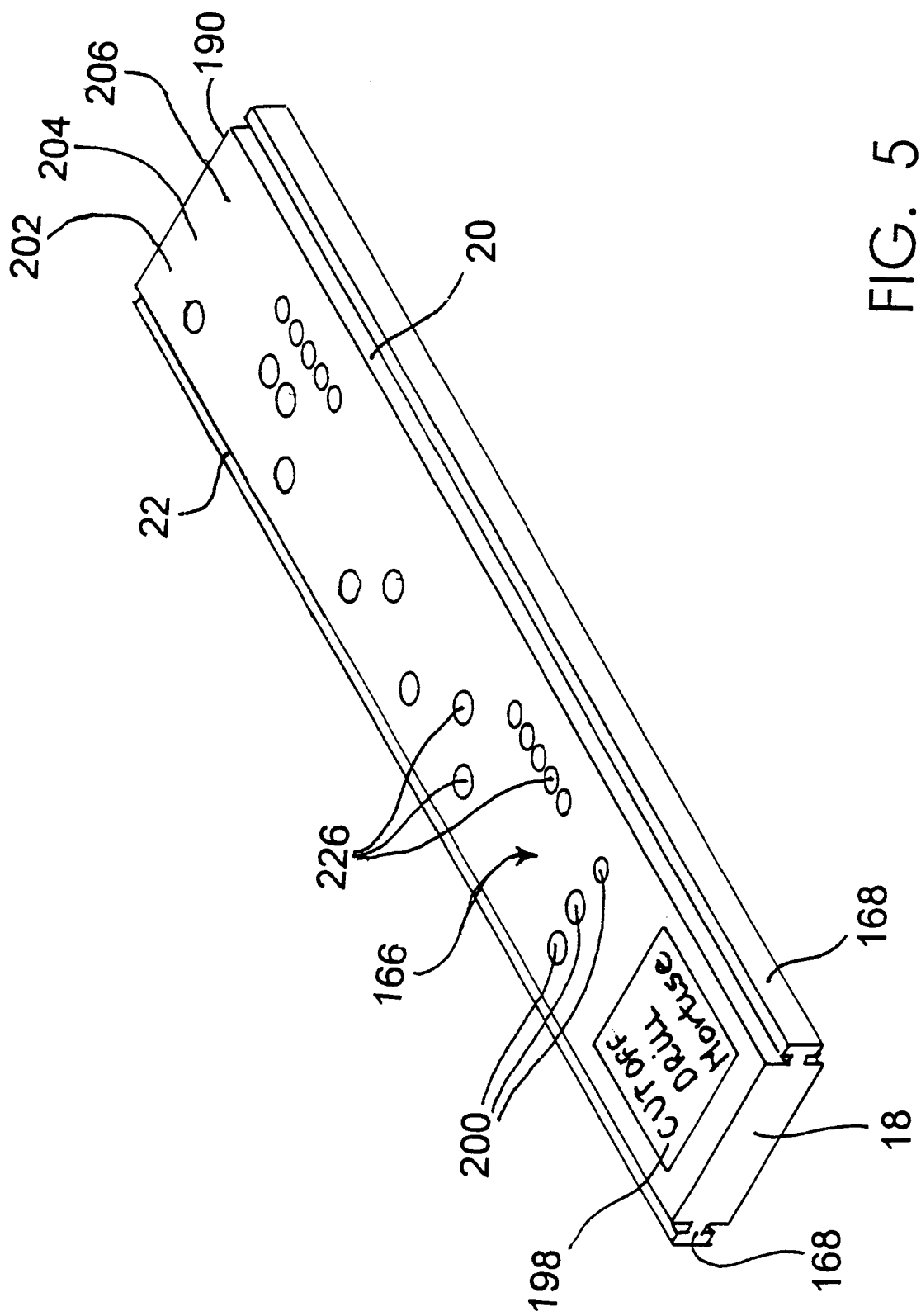
FIG. 5 is a perspective view of an alternate universal memory stick.

Alternatively, shown in FIG. 5, the memory stick template may be fabricated directly into the memory stick 166, thereby avoiding the need for the separate slideably received template 174. For example, the longest length of material needed for a project is determined from, for example, a project material list. A length of board is cut to a predetermined size longer than the largest material required, for example, about ¾" thick, to about 3" wide and about 5" longer than the longest material length required. First and second side edges 20, 22 are cut, using known methods into a T-bar 168, thereby forming a universal memory stick 166 slidable into the T-slot 57 of the primary fence 52. A home (start) position 200 is established by drilling a hole of predetermined size at a predetermined location, for example, ¼" in diameter about four inches from the first end 18 and about ½" from a side 20, 22 to initiate a track of stop positions 226 for the desired cutting function. Holes are measured and drilled at the position required for the desired function needed for the particular project, at predetermined measurement distances or combinations thereof.

For example, using a ⅜" template and a ⅜" dado blade (not shown), making cuts at every other hole would produce a precision box joint. Additional tracks may be fabricated for additional cutting functions, such as required for fabrication of mortise, router, drilling or other specialty wood working operations. A label 198 is placed on the universal memory stick 166 to record the purpose of each track and tool setting.

Figure 6:
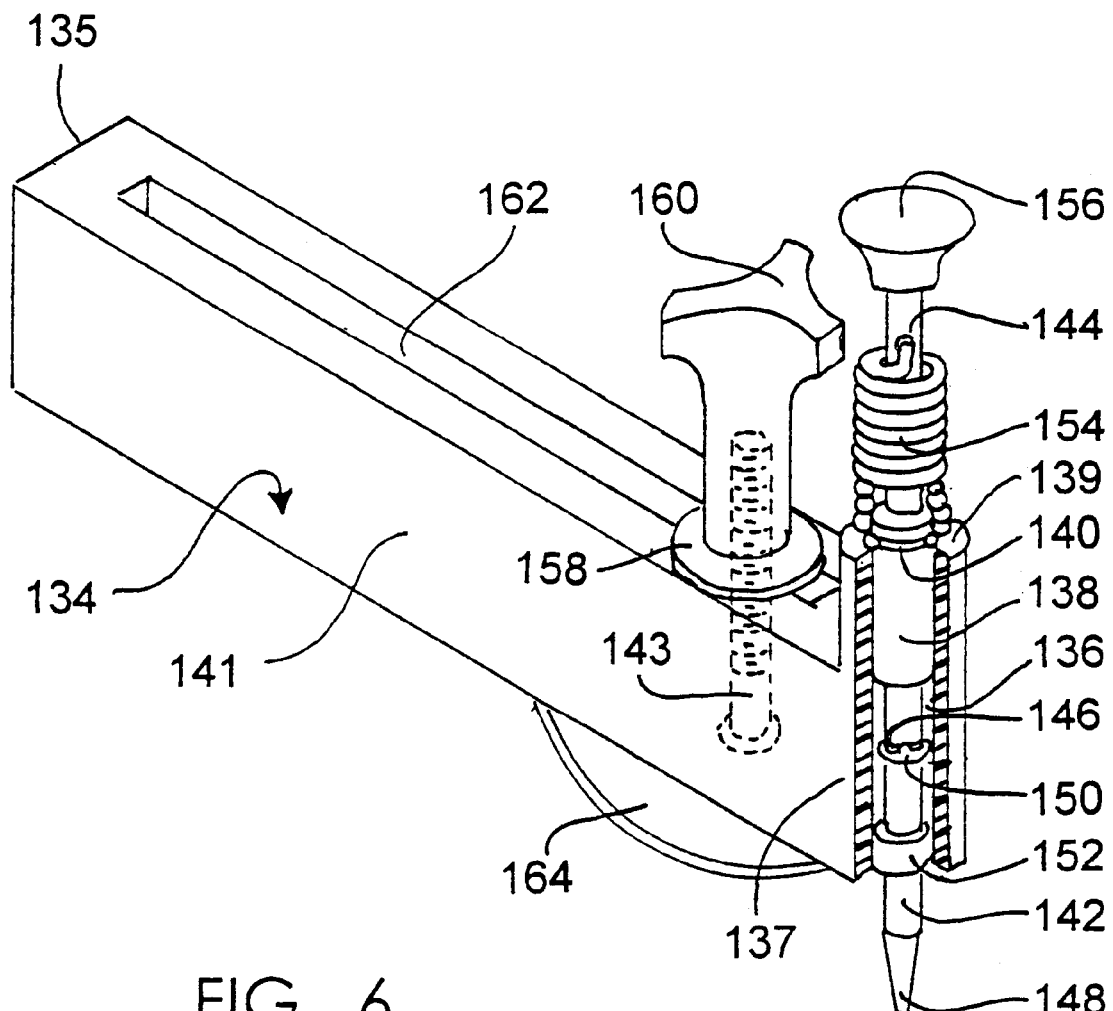
FIG. 6 is a perspective view of the follower assembly.

The follower assembly 134, shown in FIG. 6, is used to maintain a predetermined relative position of the primary fence 52 to the universal memory stick 166. The follower assembly 134 is preferably fabricated from a substantially rigid material, for example, wood, metal such as extruded aluminum, aluminum alloy and stainless steel, molded plastic, layed up plastic and combinations thereof. It is in the form of, for example, a block 141 of preselected size, for example, about 8" long, about 1¾" high and about 1¼" wide. A slot 162 about 5/16" in width begins about ½" from a first end 135 of the block 141 and extends about 5½" in length. At an opposing, second end 137, a tower 139, for example, a cylinder shaped tower, extends above the block 141 about ¾" to a total height of about 2½ inches. A first bushing 138 about ⅜" O.D.×about ¼" I.D.×about 1" with a first circumferential groove 140 located about 3/32" from the top edge of the bushing 138 is inserted in the top of the tower 139. The bushing 138 slidably receives a plunger 142 in the form of a rod about 6" long by about ¼" in diameter with an aperture 144 positioned about one inch below the plunger top. A second circumferential groove 146 is located about 4⅝" from the plunger top. The bottom of the plunger 142 is tapered at about 15 degrees to form a point 148 having a tip radius, typically about 1/32".

Figure 15:
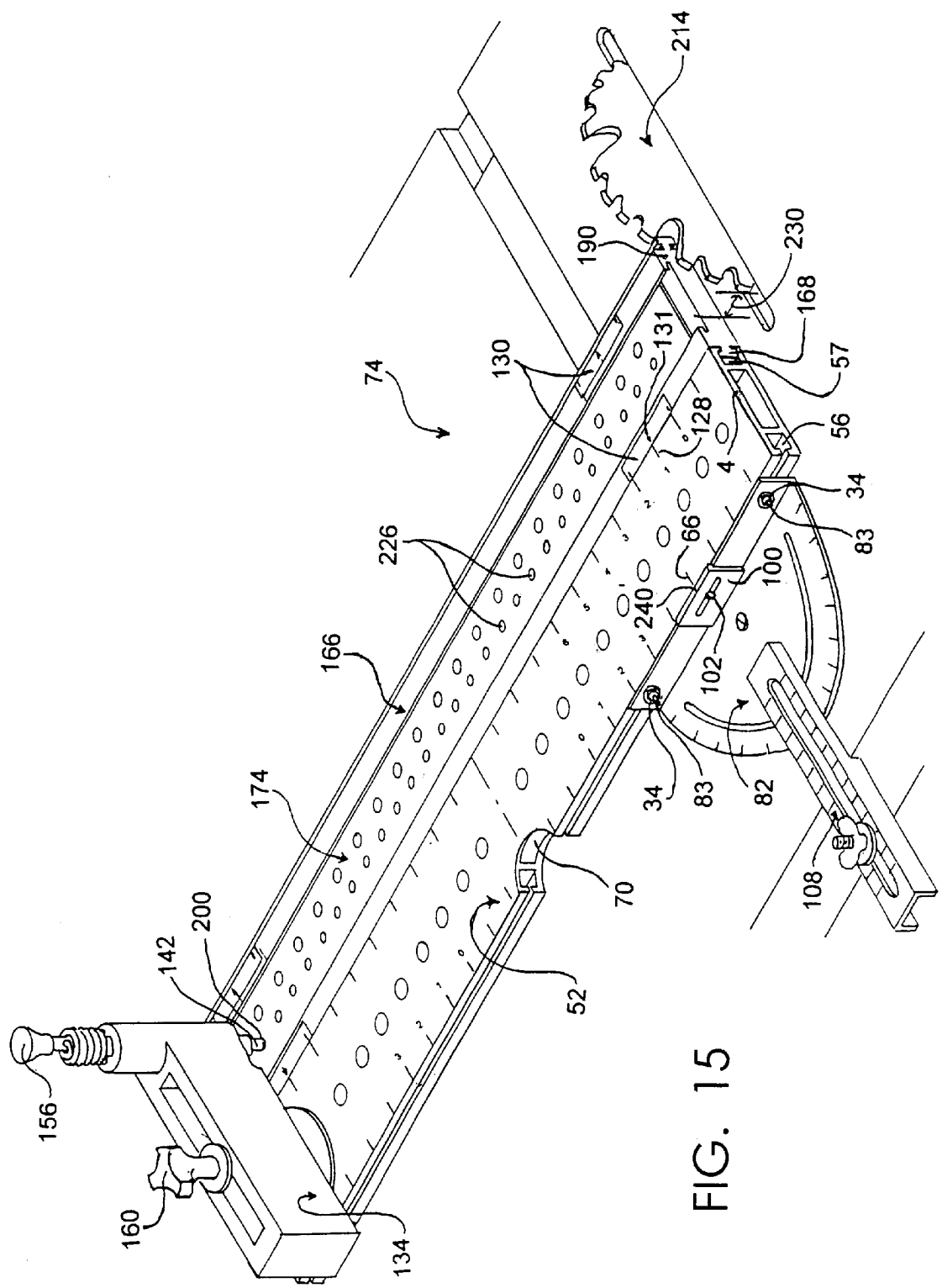
FIG. 15 is a perspective view of a jig/miter arrangement.

This point 148 assures the plunger 142 will center into a universal memory stick stop position 226 to position and hold the memory stick 166 (FIG. 15). While this amount of taper enables the plunger 142 to fit into a hole about 1/16" to about ¼" in diameter, it should be appreciated that by varying the taper size, a wider range of stop position hole sizes may be utilized.

A C-clip 150 inserted into the second circumferential groove 146 limit s the up and down travel of the plunger 142 as it contacts the lower surface of the first bushing 138 and upper surface of a second bushing 152. Second bushing 152 about ¼" I.D.×about ⅜" O.D.×about ⅜" long is inserted in the bottom of tower 139 to slidably receive the plunger 142. At its rest position, the plunger point 148 protrudes about ⅝" below the bottom of the block 141. A spring 154, for example, a coil spring, of predetermined strength, for example, about 1¼" long×about ½" I.D. is placed to slidably receive the top of the plunger rod 142. The coil spring bottom is secured, for example, by the groove 140 of first bushing 138, for example, by crimping the coil spring into the groove. The coil spring top is secured to the plunger rod 142, for example, by inserting an end through plunger rod hole 144. Alternatively, the spring 154 may be enclosed within the tower 139, or a leaf spring (not shown) may be substituted for the coil spring, or the plunger rod 142 may be screwed into position. The plunger may be designed to be "at rest" in either the engaged or disengaged position. The term "at rest" means the position in which there is no external force directed to the plunger. Knob 156 is attached to the top of the rod 142.

When the knob 156 is raised, it pulls up the plunger 142 and the tip 148 is retracted, releasing the plunger 142 from the universal memory stick stop position 226 (FIG. 15). When the plunger 142 is released, the spring 154 urges the plunger 142 to return to the spring biased down position. To change stop positions, plunger 142 is raised and universal memory stick 166 is slid along primary fence 52 to the next desired stop position 226, whereupon plunger 142 is released to secure that position.

Figure 3B:
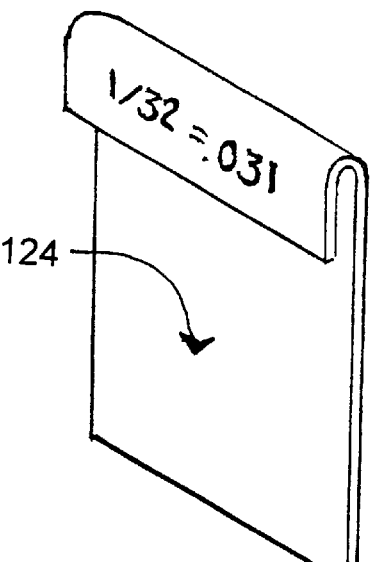
FIG. 3b is a perspective view of the shim.

In this manner, single projects may be fabricated without making multiple memory sticks. For example, with a ⅛" kerf saw blade (not shown), three passes of the work piece through the cutting blade would produce a ⅜" dado without having to change to a dado blade. Optionally, placing a shim 124 (FIG. 3b) between the work piece (not shown) and memory stick 166 allows for even more precision in these specialty cuts.

Referring to FIGS. 1b, 6 and 15, bolt 143 passes through primary fence countersunk bottom hole 44, primary fence top hole 42, non-slip washer 164, and slot 162, to receive washer 158 and fluted nut 160, securing the follower assembly 134 to the primary fence 52. Primary fence bottom hole 44 is countersunk to receive bolt 143 so that the primary fence 52 will lay flat on the power tool table. Non-slip washer 164 provides clearance between the primary fence top 10 and the bottom of the follower assembly (not shown) and prevents the follower assembly 134 from turning.

In a second preferred embodiment, the present invention is used in conjunction with a miter gauge. Shown in FIG. 7, miter gauge 82 has a base 86 fastened to a miter bar 88 with a pivot screw 90. The base 86 has a degree cutout slot 92, degree scale 94, degree indicator 96 and a locking screw 98. Degree angle positions are locked with bolt 26, washer 32, and nut 38 through hole (not shown) in the miter gauge bar 88. The blade indicator 100 is held in position with screw 102 in the taped miter gauge base 86. The miter gauge bar 88 has a hole 110 in its front end. Miter gauge base 86 has hole 58 in its vertical lip for fastening to the primary fence 52 with, for example, T-bolt 83 slidably received by T-slot 56 (FIG. 1) and secured with washers 30 and nuts 34.

Figure 8:
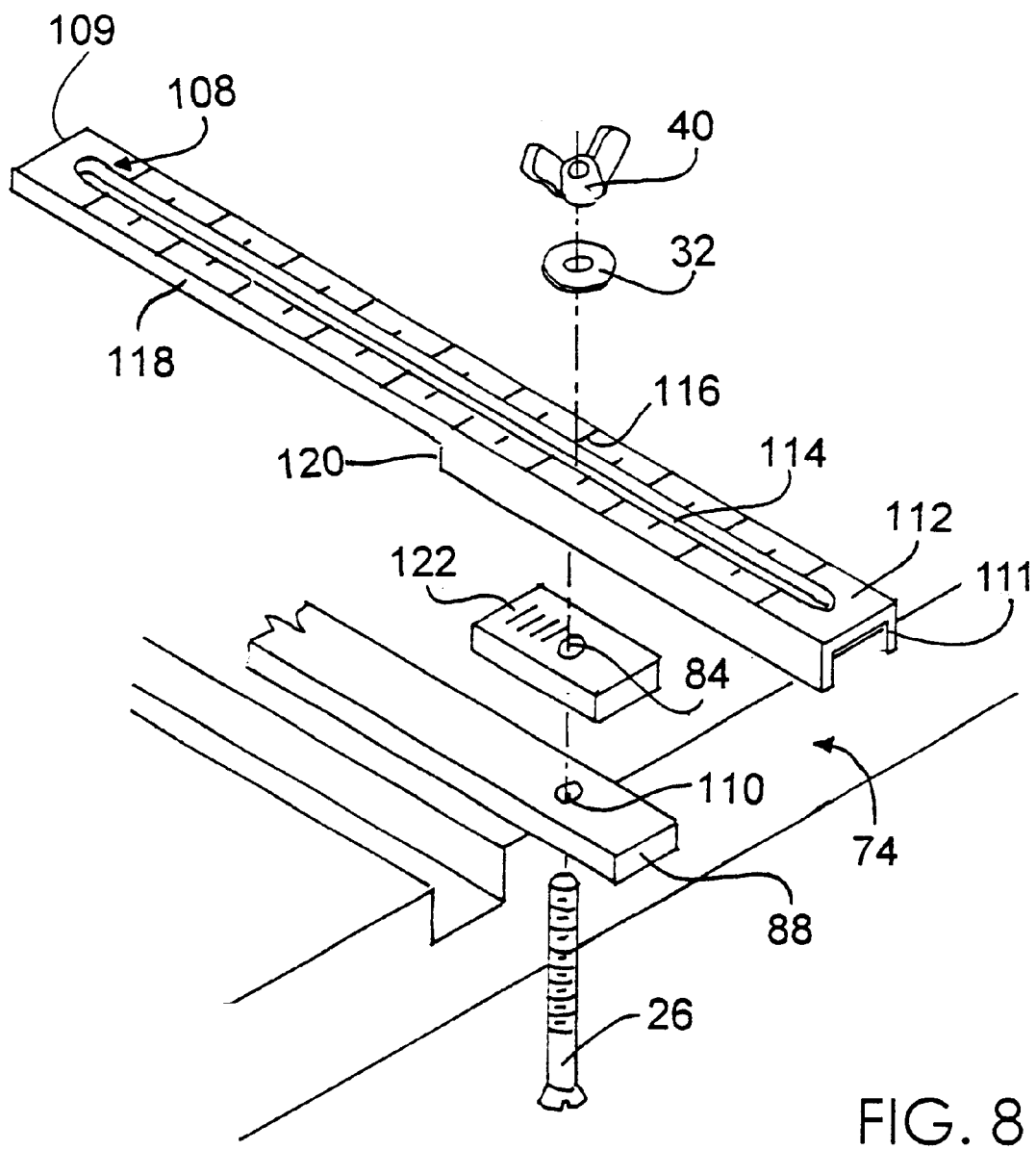
FIG. 8 is a perspective view of the forward stop.

Often times, it is desirable to reproduce a predetermined stop point as the work piece is passed through a cutting blade, for example, when fabricating specialty cuts such as dovetail, dado and kerfs. A stop attachment for reproducing a stop point is shown in FIG. 8. Bolt 26 is passed through hole 110 in miter gauge bar 88, spacer 122, and slot 114 in channel arm 112 to receive washer 32 and wing nut 40, thereby creating forward stop assembly 108. Forward stop assembly channel arm 112 is fabricated from a substantially rigid material, for example, extruded aluminum or alloy, for example, about 12" long×about ¾" high with a slot 114 beginning about ¼" from the front end (the end closest to the primary fence) extending to about ¼" from its back end 111. The channel arm is scaled 116 to a predetermined unit of measurement, as described above. A step 118 about 5" long×about ¼" high, produces a stop 120. Spacer 122, about 3"×about ¾"×½" high placed between the miter gauge bar 88 and channel arm 112 raises the channel arm 112 to clear the miter gauge base 86. By loosening wing nut 40, forward stop channel 112 is set to a predetermined position so that stop 120 will contact the front edge of the power tool table 74 to stop the forward motion of the miter gauge assembly 82 as the work piece is fed into the cutting blade.

Figure 7:
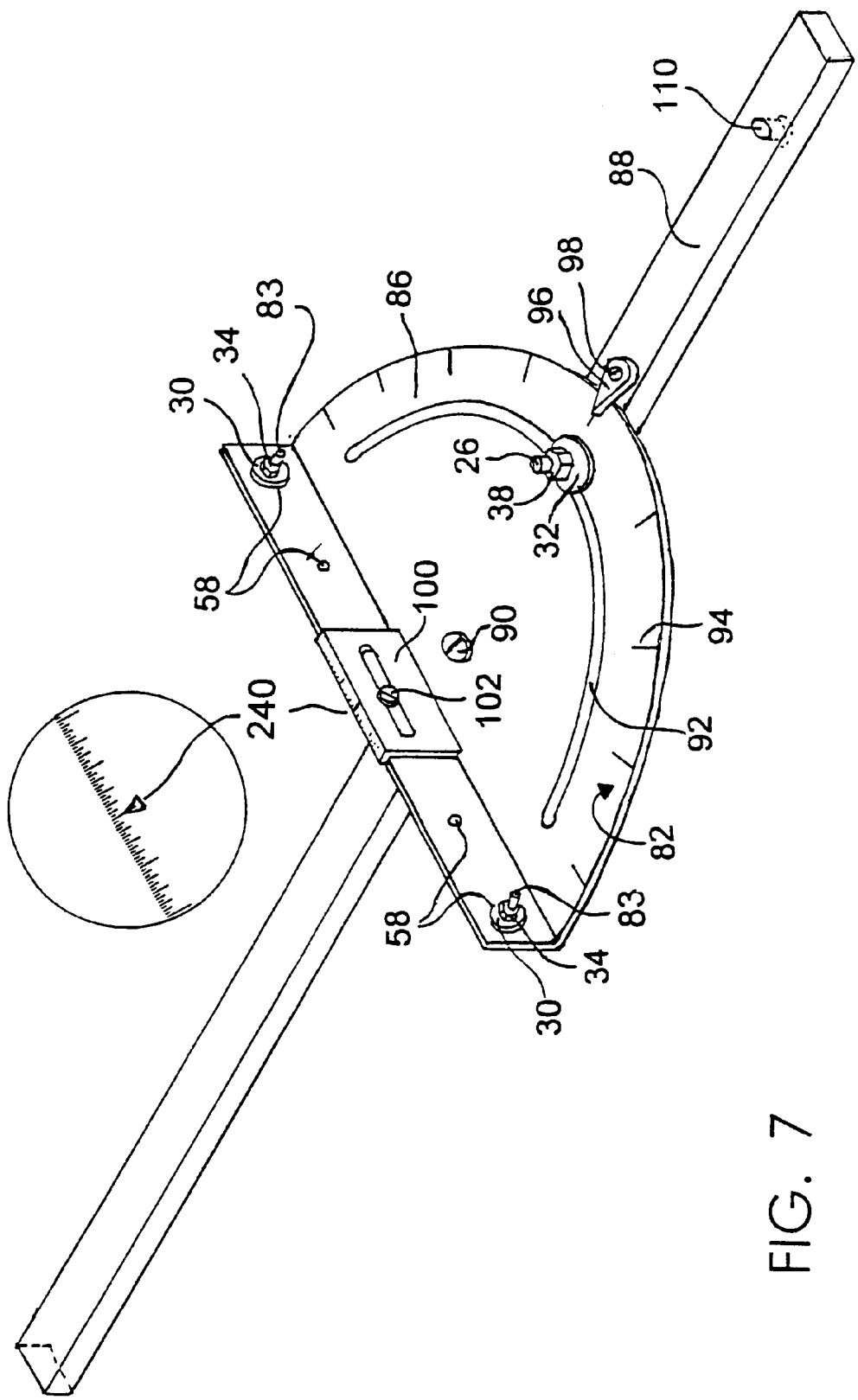
FIG. 7 is a perspective view of the miter gauge.

For basic miter operation, shown in FIG. 15, miter gauge 82 is placed on power tool table 74 in standard fashion. With cutout 70 facing the user, first primary fence T-slot 56 slidably receives miter gauge T-bolt 83 (FIG. 7). Universal memory stick 166 with universal stick template 174 is slidably received by the primary fence 52 using second primary fence T-slot 57 and universal memory stick T-bar 168.

Universal memory stick 166 is slid relative to primary fence 52 until arrow 131 of pointer scale 130 and primary fence 52 baseline unit measurement mark 128 are aligned. It is preferable for the baseline unit measurement mark 128 to be located closer to the primary fence second end 4 (the end closest to the saw blade 214), than the pointer scale 130 is to the memory stick face end 190. In this manner, once aligned, the memory stick face end 190 will be offset from the saw blade 214, preventing inadvertent contact with the blade 214, and resultant damage to the memory stick 166.

Follower assembly 134 is secured to primary fence 52 as described above so that plunger 142 is in home (start) position 200 of the universal memory stick 166 while still maintaining alignment of the arrow 131 of pointer scale 130 and baseline unit measurement mark 128, and secured by tightening fluted nut 160.

Nut 34 (FIG. 7) is loosened and primary fence 52 and memory stick 166 are related until the face end 190 (FIG. 4) of memory stick 166 is precisely one unit measurement 128 (FIG. 16) from saw blade 214. After alignment of primary fence 52, universal memory stick 166 and miter gauge 82, nut 34 is tightened. A sample work piece cut is made to verify distance between until face end 190 (FIG. 4) of memory stick 166 and saw blade 214 is precisely one unit measurement. It is important that this measurement is precise, as all measurements are affected by this setting. Miter gauge blade indicator mark 240 (FIG. 7) is positioned to align with a reference unit measurement mark 66 (FIG. 1) of primary fence 52 and locked with screw 102 (FIG. 7). In this manner, by recording the settings, the user is able to remove primary fence and memory stick for other uses if desired and return to the precise position established for that power tool by realigning the reference unit measurement mark 66 with the miter gauge blade indicator mark 240.

To compensate for different cutter thickness or for centering of a router or dado blade, nut 34 (FIG. 7) is loosened and memory stick 166/primary fence 52 assembly is related so the center of the blade or cutter (not shown) will be exactly one unit measurement from memory stick face end 190 and secured in that position with nut 34 (FIG. 7).

Figure 9:
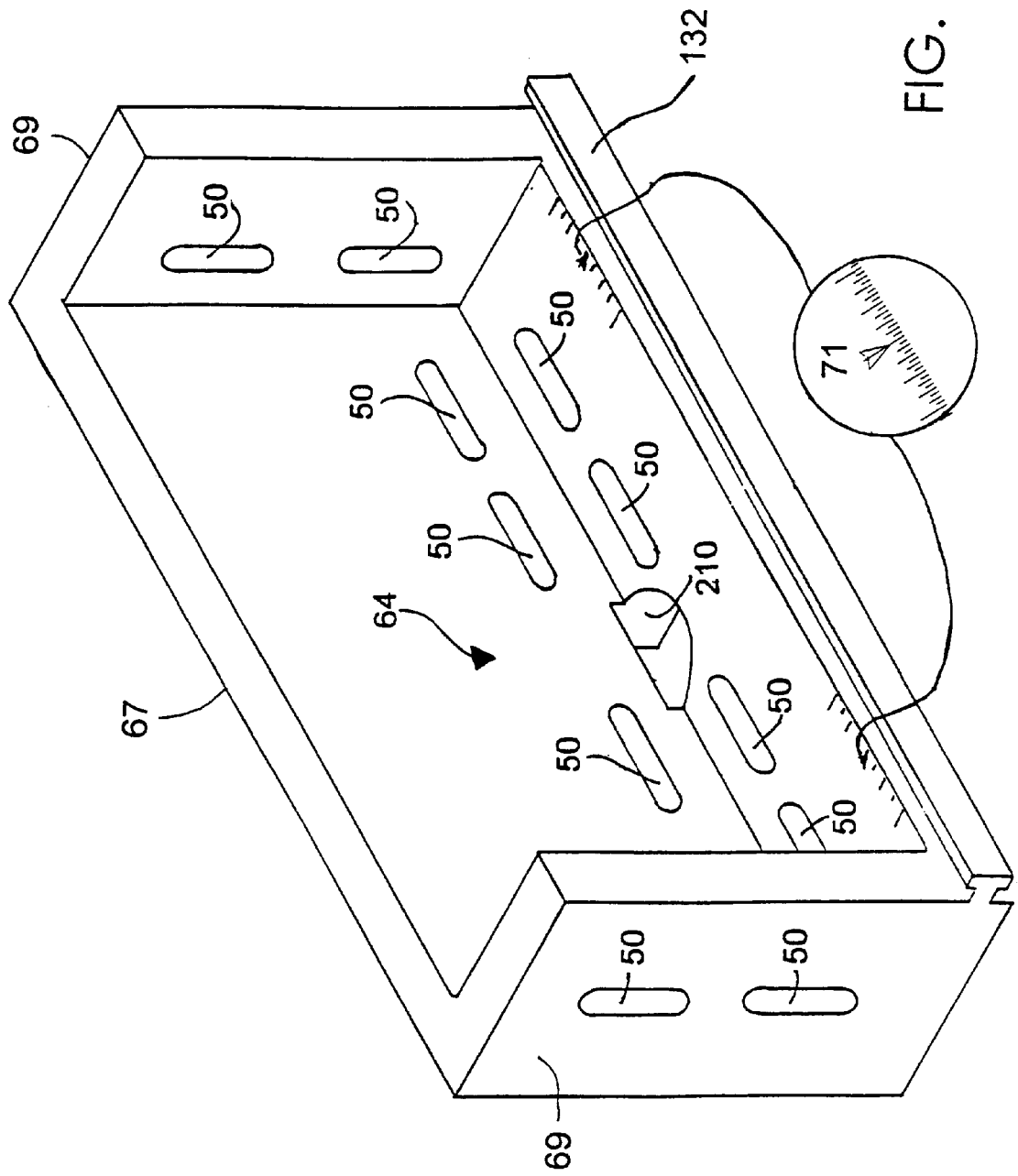
FIG. 9 is a perspective view of the backboard.

In a third embodiment, shown in FIG. 17, right angle bracket 76 is fastened to universal memory stick 166 with bolt 26, washer 32, and nut 38 through hole 188 (FIG. 4). Elongated hole 48 allows for adjustable attachment of other apparatus, for example, backboard 64. Backboard front edge is formed in the shape of a T-bar 132 (FIG. 9). Upon attachment of the backboard 64 to the universal memory stick 166, backboard T-bar 132 becomes an extension of universal memory stick T-bar 168 to be slidably received by T-slot 57 of primary fence 52, making backboard 64 an extension of universal memory stick 166.

Backboard 64 is designed to guide and hold a work piece or other apparatus. In the preferred embodiment, it is about 12" wide×about 6" high×about 3¼" deep with ¾" walls. At the center of the bottom front edge, extending up the backboard front face, is a cutout 210 about 1½"×about 1½" which like cutout 70 of primary fence 52 (FIG. 1), allows for drilling or routing operations. A series of elongated holes 50 used as fastening points for additional attachments, flank cutout 210 across its width, extend across backboard front face 67 and extend upward on both backboard side walls 69. Backboard arrow 71 of pointer scale 130 is used to indicate backboard position relative to cutting blade in the same manner as primary fence arrow 131.

Figure 10:
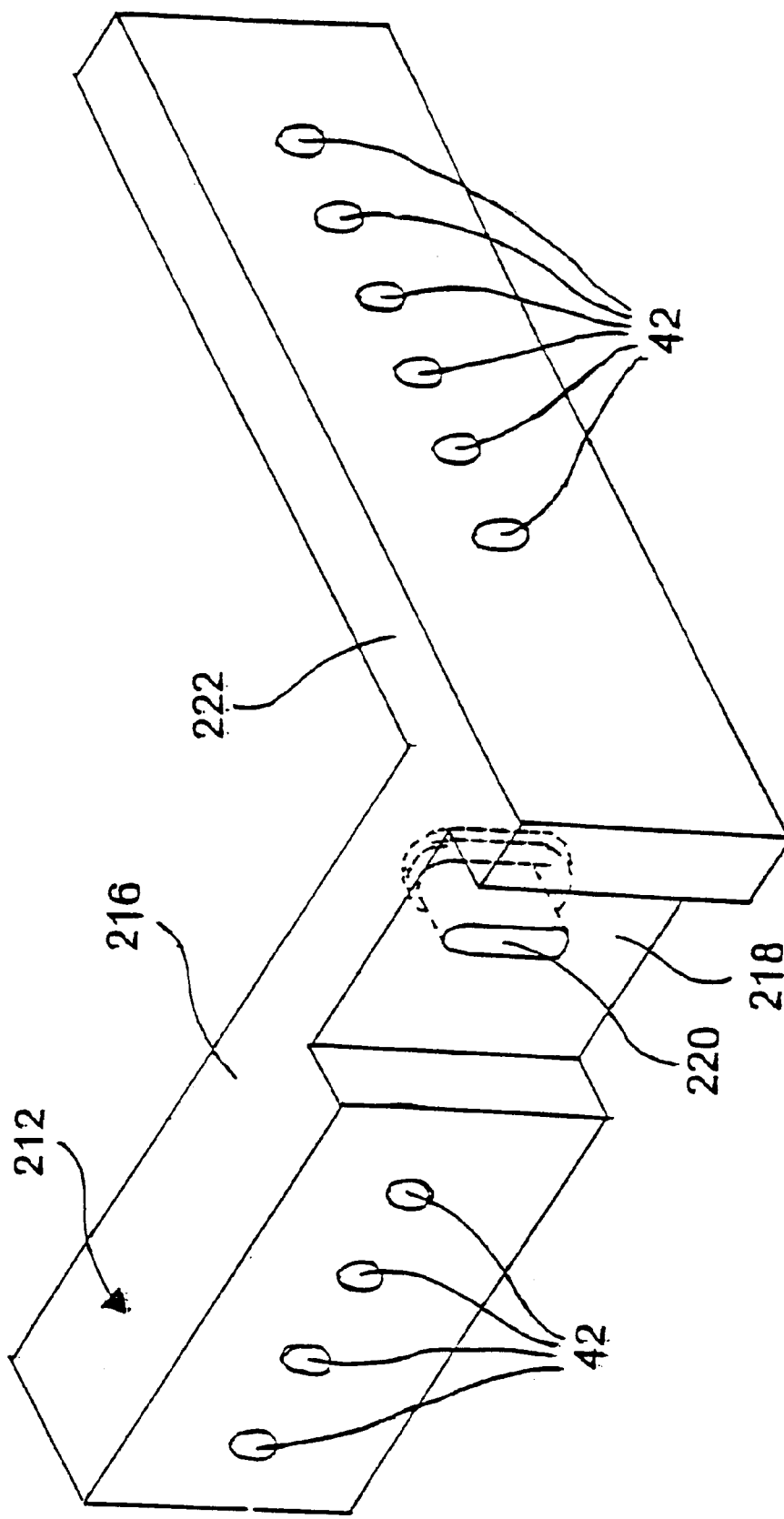
FIG. 10 is a perspective view of the extension arm.

Preferably, backboard arm 212 is fabricated from a material that will not damage a cutting blade, for example, wood or plastic. Forward extending arm 216 (FIG. 10) is about 1½" thick×about 3" high with about a ½" cut out 218 to straddle the side of the backboard 64 to create a secure attachment. The remaining material allows the spacing to coincide with the backboard arrow 71 of pointer scale 130, and prevent the cutting blade from contacting the backboard 64. A vertical recessed elongated hole 220 about ¼"×about 1½" enables the forward arm 216 to fasten to the backboard 64 with, for example, carriage bolt 28, washer 32, and nut 34. The side-extending arm 222 is, for example, about 12" long×about 3" high×about ¾" thick with holes 42 spaced about 1" across the center to hold additional attachments.

Figure 16:
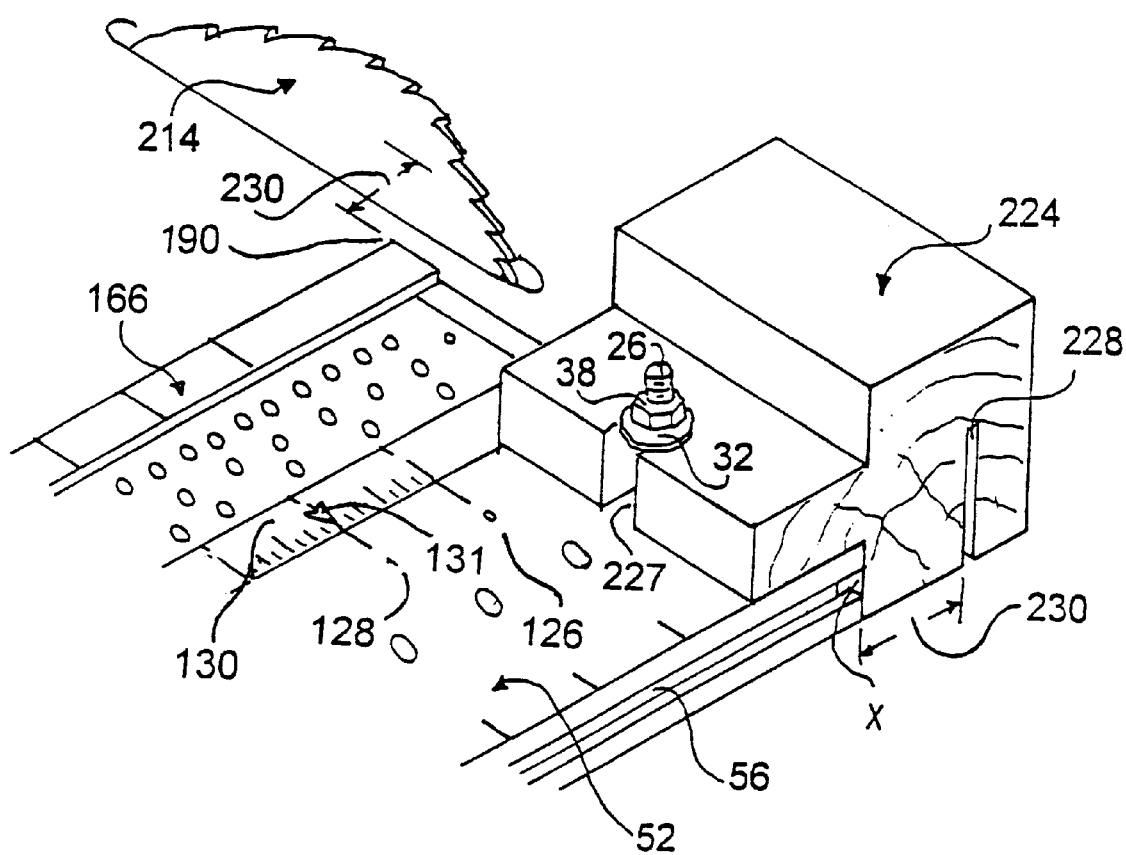
FIG. 16 is a perspective view of the attached stop block.

Optional cut off block 224, shown in FIGS. 11 and 16, is a back up to reduce tear out or splintering of the work piece. Cut off block 224 is made of, for example, wood about 3"×3½"×3", with a rabbit cut of about 1½×¾". A notch 227 in the rabbit cut enables cut off block 224 to be fastened to the end of the primary fence 52 with, for example, bolt 26, nut 38, and washer 32.

When, as shown in FIG. 16, miter gauge 82 feeds the work piece into the saw blade 214 or router bit (not shown), a zero vertical clearance cutter profile 228 is created, thereby reducing tear out of the work piece. The end of T-slot 56, butting against cut off block 224 at point X prevents memory stick 166 from contacting any cutter. Cut off block 224 supports the work piece and may be easily replaced or changed without disturbing any previously set adjustments.

Auxiliary fence 232, shown in FIG. 13, is fabricated as described above for the primary fence 52, to a variable, predetermined length, and, optionally, does not have primary fence 52 cut out 70. Auxiliary fence 232 can be used to extended the primary fence by inserting tenon 234 in mortise 54 (FIG. 14) of the primary 52 and auxiliary 232 fence and securing the tenon 234 with bolt (not shown) through holes 42,44. Optional support for the resulting extended length can be obtained by for example, a work stand (not shown).

Optionally, shown in FIG. 18, when primary fence 52 extends beyond a power tool table 242, support bar 246 (FIG. 12) and/or end support bar 238 can be fastened to the fence bottom, for example, by clamping or securing with bolt 26, washer 32 and nut 38 extending, for example, normal to the primary fence 52 to give additional support to the work piece and/or memory stick.

For miter operation, the present invention operates as follows. Universal memory stick 166 T-bar 168 (FIG.17) is slidably attached to primary fence T-slot 57. Follower assembly 134 is installed on primary fence 52 with bolt 143 through holes 42, 44 (FIG. 1) non-slip washer 164, slot 162, washer 158, and fluted nut 160 (FIG. 6). Plunger 142 is set in home position 200 of memory stick 166 with a predetermined unit spacing, for example, a one-inch spacing template installed. Arrow 131 of pointer scale 130 (FIG. 15) is aligned with baseline unit measurement mark 128 (FIG. 15) and secured in this position by tightening fluted nut 160 (FIG. 15).

Miter gauge 82 is attached to first t-slot 56 of primary fence with the T-bolts 83 through hole 58 (FIG. 7), washer 32 and nut 34. The miter gauge 82/primary fence 52 assembly is positioned so face end 190 (FIG. 15) contacts the inside of the saw blade 214 (FIG. 15) and secured by tightening nut 34 (FIG. 7).

Plunger knob 156 (FIG. 17) is lifted to disengage plunger point 148, and memory stick 166 is slid relative to primary fence 52 until plunger point 148 aligns with the one inch hole in template and arrow 131 indicates one inch 128 (FIG. 16). Plunger 142 is released to allow plunger point 148 to engage and hold the memory stick 166 in place. A sample work piece is cut to verify it is precisely one inch 230 (FIG. 16). Readjustment is made with nut 34, as required.

Set screw 102 (FIG. 17) is loosened to position the blade indicator 100 so blade indicator mark 240 aligns precisely with inch mark 66 on primary fence 52 to accurately establish mark 66 (FIG. 1) relative to the inner edge of saw blade 230 (FIG. 16). After proper alignment, set screw 102 (FIG. 17) is re-tightened. Optionally, cutoff block 224 is attached to primary fence 52 by sliding cut off block slot 227 of the under bolt 26 through end holes 42, 44 washer 32 and nut 38, keeping cutoff block 224 against the end of the primary fence 52, and secured by tightening nut 38.

Optional backboard 64 (FIG. 17) is connected to universal memory stick 166 with right angle bracket 76 (FIG. 17) with bolts 28 and 26. Backboard arrow 71 of pointer scale 130 is used to indicate the correct distance to the saw blade. Other optional attachments, for example, L-shaped backboard arm 212 and/or the work piece can be fastened to the backboard 64 to fabricate specialty cuts such as box, dovetail, dado and kerfs.

When desired, forward stop assembly is attached to the miter gauge bar 88 (FIG. 8) with bolt 26 through miter bar 88, spacer 122, slot 114, washer 32, and wing nut 40. Forward stop120 is adjusted to a preselected position and locked in place with nut 40.

In this manner, the present invention can make quick and precise specialty cuts such as cut off; stop dados; stop dovetails; dados; half, full and blind dovetail; finger joints; mortise; tenons; incremental holes and kerfs. The memory stick template is able to store many, if not all, stops needed for a particular project for use at a later date. When the power tool is needed for another use, the jig of the present invention can be removed and set aside without disturbing the previously set adjustments.

For use in drilling operations, the primary fence 52 (FIG. 18) is fastened to drill press table 242 (FIG. 18), for example, with J-bolts 72 (FIG. 1b) or clamps at the preselected throat clearance. Drill point 16 is aligned with centerline 36 (FIG. 18) of primary fence 52. Optionally, primary fence 52 and auxiliary fence 232 may be combined by inserting tenon 234 (FIG. 18) into mortise 54 of each and fastened with bolt, washer, and nut through the holes 42,44. Optional support is provided by end support 238 (FIG. 18) as needed. Memory stick 166 is slid into T-slot 56 and positioned so face end 190 is aligned with the drill point 16. Follower assembly 134 is installed as described above so plunger 142 is seated in home position 200 of the preselected track while still maintaining the alignment with face end 190, drill point 16 and centerline 36, and secured in position by tightening fluted knob 160.

To drill holes with predetermined spacing, plunger knob 156 is raised to disengage plunger point 148 from home position 200. Memory stick 166 is moved to first position 196 (FIG. 5), and released to engage stop. The work piece is slid against face end 190 of memory stick 166 and the hole is drilled in the work piece.

The size of the hole drilled in the work piece is not limited by the size of the memory stick stop. As the operation is repeated, the information recorded on the memory stick is physically transferred to the work piece. Therefore, the number of stops, hence the number of holes drilled in the work piece, is entirely user controlled.

While the above description contains many specifics, these should not be construed as limitation on the scope of the invention, but rather as an exemplification of preferred embodiments thereof. It should be apparent to those skilled in the art that many other variations are possible. For example, the work piece material is not limited to wood, but may include any material capable of being cut, such as metal and plastic. Furthermore, the specific dimensions used in the above description are exemplar only and are not meant as limitations. They may, for example, be scaled downward for use by the hobbyist, or modified to adapt to non-woodworking cutting machines. Additionally, it should be understood that while wing nuts and fluted nuts have been used as exemplar, these and other fastening devices, such as quick release devices, allowing for ease of hand tightening and lock down may be utilized wherever a nut is indicated. It is also within the scope of the present invention that power tool manufacturer supplied fences can be adapted for use as the primary fence.

These examples and embodiments are intended as typical of, rather than in any way limiting on, the scope of the present invention as presented in the appended claims.

What is claimed is:

1. A jig for reproducibly and accurately positioning a work piece on a power tool comprising:
   a primary fence having a first end, an opposing second end, a first side, an opposing second side, a top and opposing bottom, wherein the first and second sides are interposed between the first and second ends and the top and opposing bottom are supported by the first end, second end, first side and second side, the top further including a baseline measurement mark;
   a universal memory stick slidably attached to the primary fence, the memory stick having a first end, an opposing second end forming a face, a first side, an opposing second side and a top, wherein the first and second sides are interposed between the first and second end and the top is supported by the first end, second end, first side and second side, the top further including a pointer;
   a universal stick template positioned on the universal memory stick top; and
   a follower assembly mounted to the primary fence for engaging the universal stick template, wherein
   the baseline measurement mark, the pointer and the follower assembly are effectively located to establish and reproduce an initial relative position and at least one secondary relative position of the primary fence to the universal memory stick.

2. The jig of claim 1 wherein the primary fence, universal memory stick and follower assembly are fabricated from substantially rigid materials.

3. The jig of claim 2 wherein the substantially rigid materials are selected from the group consisting of extruded aluminum, aluminum alloy, stainless steel, molded plastic, layed up plastic, wood and combinations thereof.

4. The jig of claim 1 wherein the primary fence is substantially hollow.

5. The jig of claim 4 wherein the substantially hollow primary fence includes an inner chamber forming a mortise of preselected dimension extending from an inner surface of the top to an inner surface of the bottom and at least one outer chamber flanking the inner chamber.

6. The jig of claim 5 wherein the outer chamber includes an opening with an upper and lower lip in an outside wall forming a T slot for slidably receiving a mating T-bar.

7. The jig of claim 6 wherein the T-bar is machined as part of at least one of the universal memory stick first and second sides.

8. The jig of claim 6 wherein the T-bar is machined as part of a power tool attachment.

9. The jig of claim 1 further including a means for attaching the primary fence to the power tool.

10. The jig of claim 1 wherein the primary fence includes at least one hole having a first orifice on the top and countersunk orifice on the bottom.

11. The jig of claim 10 wherein the at least one primary fence hole is positioned to effectively affix the primary fence to a member of the group consisting of a power tool surface, the follower assembly, a support bar, a tenon, an optional attachment and combinations thereof.

12. The jig of claim 1 wherein the primary fence baseline measurement mark is positioned to indicate a distance from the primary fence end to a cutting blade when the mark is aligned with the pointer.

13. The jig of claim 12 wherein the primary fence baseline measurement mark is positioned closer to the primary fence second end than the pointer is to the memory stick second end such that once aligned, the memory stick second end will be offset from a power tool cutter.

14. The jig of claim 1 wherein a cutout is machined into the primary fence first side.

15. The jig of claim 1 wherein a bracket is fastened to the universal memory stick second end.

16. The jig of claim 1 wherein the universal stick template is fabricated into the universal memory stick top.

17. The jig of claim 1 wherein the universal stick template is removably received by the universal memory stick.

18. The jig of claim 17 wherein the universal memory stick top includes a channel of predetermined depth, the channel having two side walls, each side wall having an undercut of predetermined size machined outward at a top of each side wall and extending the full length of the universal memory stick for slidably receiving the universal stick template.

19. The jig of claim 18 wherein the channel is of predetermined depth such that a space remains below the slidably received universal stick template sufficient to receive a plunger point extending from the follower assembly.

20. The jig of claim 1 wherein the universal stick template includes at least one stop position at a predetermined location for positively securing the follower assembly.

21. The jig of claim 20 wherein the at least one stop position is at least one hole of sufficient diameter to positively receive a follower assembly plunger point.

22. The jig of claim 21 wherein the at least one hole includes a home hole and at least one hole selected from the group consisting of holes repeating at a preselected unit of measurement, at least one hole required by a specific project, and combinations thereof.

23. The jig of claim 22 wherein the at least one hole is aligned in at least one track.

24. The jig of claim 1 wherein the universal stick template is removably positioned on the universal memory stick top such that it can be stored and reused.

25. The jig of claim 1 wherein the follower assembly comprises a block having a top, a bottom, a first end, a second end, a first side and a second side, a slot for receiving a bolt engaging the primary fence, the bolt passing from the bottom to the top and secured with a nut, and a tower at the second end for slidably receiving a plunger, the plunger used to positively secure the follower assembly to the at least one universal stick template stop position.

26. The jig of claim 25 wherein the bolt engaging the primary fence passes through a countersunk orifice on the primary fence bottom and a first orifice on the primary fence top.

27. The follower assembly of claim 25 wherein the plunger includes a tapered bottom to center in the at least one stop position.

28. The follower assembly of claim 25 further including a means for engaging and disengaging the plunger.

29. The jig of claim 1 further including a miter gauge comprising a base, a miter bar fastened to the base, and a vertical lip arising from the base for fastening to the primary fence first side.

30. The jig of claim 29 further including a pivot screw for rotating the base on the miter bar.

31. The jig of claim 29 further including a forward stop assembly attached to the miter bar for reproducing a predetermined cutting stop point.

32. The jig of claim 31 wherein the forward stop assembly comprises
a channel arm having a top and a bottom;
a spacer positioned between the channel arm and the miter bar for raising the channel arm to provide clearance from a power tool table;
the channel arm bottom including a step for creating a positive stop against a front edge of the power tool table; and
the channel arm slidably fastened to the spacer, the spacer fastened to the miter bar, such that the relative position of the positive stop to the miter bar is adjustable.

33. The jig of claim 1 further comprising a backboard for holding a work piece; the backboard fastened to the universal memory stick so as to become an extension of the universal memory stick; the backboard including a front edge in the shape of a T bar to be slidably received by the primary fence T slot.

34. The jig of claim 33 wherein the backboard further includes a pointer scale to indicate a backboard position relative to the cutter.

35. The jig of claim 33 wherein the backboard further includes a cutout positioned to receive a cutting tool.

36. The jig of claim 35 wherein the cutting tool is selected from the group consisting of a drill bit and a router.

37. The jig of claim 33 wherein the backboard further includes an extending arm for receiving an attachment.

38. The jig of claim 1 further including a cut off block for reducing tear out of a work piece fastened to the primary fence second end, positioned to effectively support the work piece.

39. The jig of claim 1 further including an auxiliary fence of predetermined length attached to the primary fence for effectively extending the primary fence length.

40. The jig of claim 39 wherein the auxiliary fence is attached to the primary fence by a mortise and tenon.

41. The jig of claim 1 further including a support bar fastened to the primary fence for providing additional support to the work piece and memory stick.

42. The jig of claim 1 wherein the primary fence further includes a cutout in the primary fence first side for accommodating a cutting tool.

43. The jig of claim 1 further including a shim fastened between the memory stick and work piece.

44. The system of claim 43 wherein the power tool is selected from the group consisting of a saw, a router and a drill.

45. A system for reproducibly and accurately performing operations on a work piece comprising:
a power tool;
a primary fence attached to the power tool, the fence having a first end, an opposing second end, a first side, an opposing second side, a top and opposing bottom, wherein the first and second sides are interposed between the first and second ends and the top and opposing bottom are supported by the first end, second end, first side and second side, the top further including a baseline measurement mark;
a universal memory stick slidably attached to the primary fence, the memory stick having a first end, an opposing second end forming a face, a first side, an opposing second side and a top, wherein the first and second sides are interposed between the first and second ends and the top is supported by the first end, second end, first side and second side, the top further including a pointer;
a universal stick template located on the universal memory stick top; and
a follower assembly mounted to the primary fence for engaging the universal stick template, wherein
the baseline measurement mark, the pointer and the follower assembly are effectively located to establish and reproduce an initial relative position and at least one secondary relative position of the primary fence to the universal memory stick.

46. A method for reproducibly and accurately positioning a work piece on a power tool comprising the steps of:
attaching a primary fence to a power tool, the primary fence having a first end, an opposing second end, a first side, an opposing second side and a top and opposing bottom, wherein the first and second sides are interposed between the first and second ends and the top and opposing bottom are supported by the first end, second end, first side and second side, the top further including a baseline measurement mark;
slidably attaching a universal memory stick to the primary fence, the memory stick having a first end, an opposing second end forming a face, a first side, an opposing second side and a top, wherein the first and second sides are interposed between the first and second ends and the top is supported by the first end, second end, first side and second side, the top further including a pointer and a universal stick template;

establishing with the baseline measurement mark, the pointer and a follower assembly mounted to the primary fence, an initial predetermined relative position of the primary fence to the universal memory stick; and establishing with the baseline measurement mark, the pointer and the follower assembly, at least one predetermined secondary relative position of the primary fence to the universal memory stick;

recording the initial and at least one secondary predetermined relative positions.

47. A method for reproducibly and accurately performing operations on a work piece comprising the steps of:

selecting a power tool;

attaching a primary fence to the power tool, the primary fence having a first end, an opposing second end, a first side, an opposing second side and a top and opposing bottom, wherein the first and second sides are interposed between the first and second ends and the top and opposing bottom are supported by the first end, second end, first side and second side, the top further including a baseline measurement mark;

slidably attaching a universal memory stick to the primary fence, the memory stick having a first end, an opposing second end forming a face, a first side, an opposing second side and a top, wherein the first and second sides are interposed between the first and second ends and the top is supported by the first end, second end, first side and second side, the top further including a pointer and a universal stick template;

establishing with the baseline measurement mark, the pointer and a follower assembly mounted to the primary fence, an initial predetermined relative position of the primary fence to the universal memory stick;

establishing with the baseline measurement mark, the pointer and the follower assembly, at least one predetermined secondary relative position of the primary fence to the universal memory stick;

recording the initial and at least one secondary predetermined relative positions; and performing the operation on a first work piece.

48. The method of claim 46 further including the steps of re-establishing the initial and secondary relative positions of the primary fence to the universal memory stick; and performing the operation on a second work piece.

49. The method of claim 46 wherein the operation is selected from the group consisting of straight cut; cut off; stop dados; stop dovetails; dados; half, full and blind dovetail; finger joints; mortise; tenons; incremental holes and kerfs.

50. The jig produced by the method of claim 46.

* * * * *